Aug. 14, 1956 — R. M. SMITH — 2,758,421
CHUTE FOR CONVEYING MOLTEN GLASS
Filed April 3, 1952
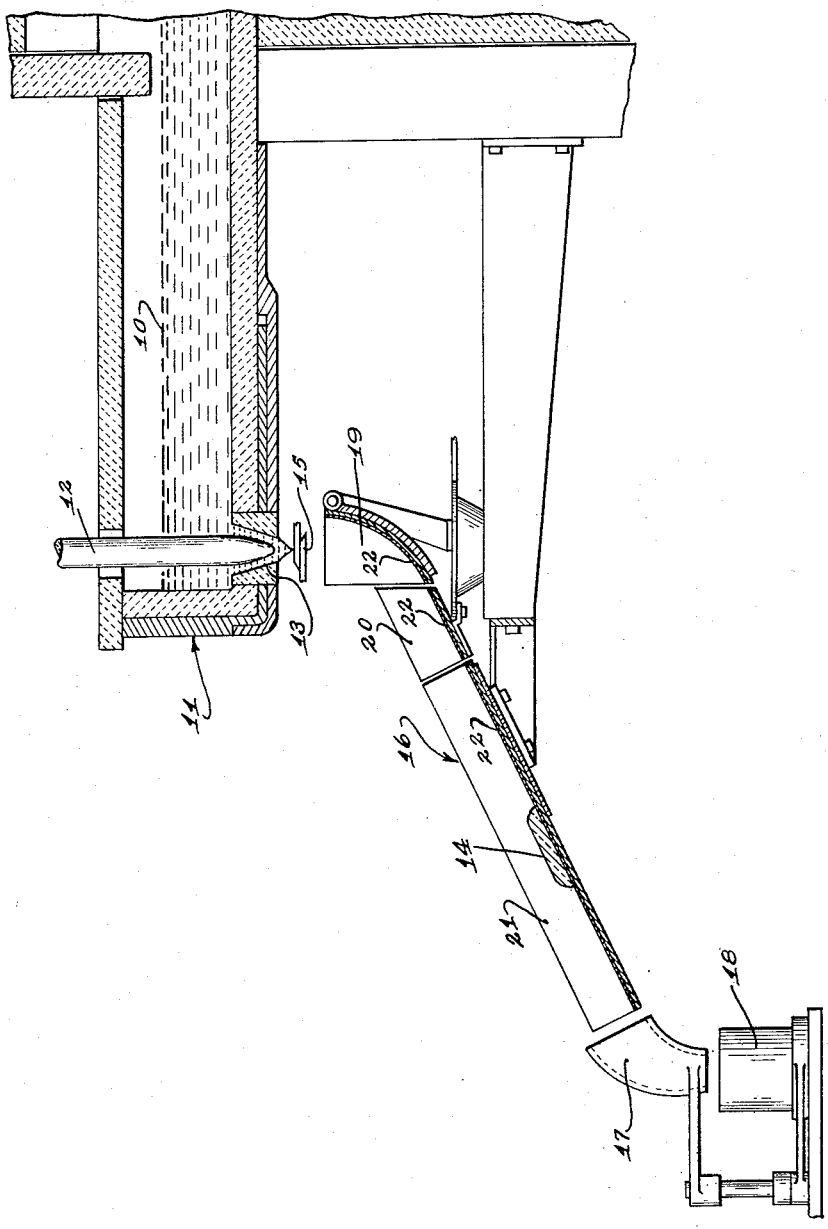
Inventor
ROBERT M. SMITH
By Rule and Hoge
Attorneys

United States Patent Office 2,758,421
Patented Aug. 14, 1956

2,758,421

CHUTE FOR CONVEYING MOLTEN GLASS

Robert M. Smith, Toledo, Ohio, assignor to Owens-Illinois Glass Company, a corporation of Ohio Application April 3, 1952, Serial No. 280,433

4 Claims. (Cl. 49—14)

This invention relates to the manufacture of glass articles from charges of molten glass and more particularly to apparatus for conveying molten glass.

In one method of glass manufacture, gobs or charges of molten glass are severed from a supply body of molten glass and are conveyed by free fall over chutes to molds or other apparatus for forming the glass articles.

Important considerations are involved in conveying the gob or charge from the body of glass to the mold or other forming mechanism. First, the time interval of travel must be constant in order to insure efficient and uniform operation. Second, the shape of the gob must not be altered during the travel since such alteration may cause distortion in the finished article. Third, the surface of the article must not be chilled or contaminated.

If the chutes for conveying the glass are plain metal or other untreated material, the hot gob of glass has a tendency to become adhered thereto resulting in either a failure to travel to the mold or a distortion in the shape of the gob. As a result it has been common practice to lubricate the chute by either intermittent or continuous application of oil or an oil-base dope. Such a treatment of the chute facilitates the passage of the glass but it is only temporary and necessitates frequent or continuous application of the oil or oil dope. In spite of such continued application, the time of travel of the gob of glass is extremely erratic and not constant. In addition, the oil has a tendency to form a carbonaceous deposit on the gob which remains in the finished article. Also the great variation in lubrication causes the gob to become scratched or marred producing scars or imperfections in the finished article. Finally, the oil and water which are always present in the vicinity of glass forming apparatus tend to further complicate the problem of lubrication by forming on the surface of the chute and adversely affecting the lubricating action.

I have determined that a satisfactory coating for chutes should have the following requirements. First, the frictional drag must be reduced to a minimum so that the travel of the gob is fast and constant, and the shape of the gob is not altered. Second, the coating must be hard and abrasion resistant in order not to contaminate the surface of the gob and in order not to be worn off the chute rapidly. Third, the coating must be resistant to heat. Fourth, the coating must be resistant to oil and water which are inherently present in the vicinity of the apparatus.

It is therefore an object of this invention to provide a coating for the chutes which obviates the difficulties inherent in an oil dope and in addition fulfills these requirements.

The accompanying drawing is a part sectional elevational view of an apparatus in which the invention may be embodied and employed.

Referring to the drawing, molten glass 10 is shown in a feeder 11. The feeder 11 is of conventional construction and is provided with a plunger 12 reciprocable in opening 13 to form gobs or charges 14 of molten glass. These gobs are severed from the body of glass by shears 15. The severed gobs fall freely and are guided by a chute 16 to funnel 17 which in turn directs the gobs to molds 18. The chute 16 may consist of several sections 19, 20, and 21.

Each of the sections 19, 20, and 21 of the chute 16 is provided with a coating 22 having the composition and made in accordance with my invention.

I have determined that a coating having the desired properties comprises a phenolic resin and a filler such as graphite. The composition of the ingredients may be varied within wide limits to provide the exact results desired. For example, I have found that a satisfactory coating will have the composition: 60% phenolic resin, 40% graphite. However the desired results can be obtained within the following limits: 20–95% phenolic resin, 5–80% graphite. If the amount of phenolic resin is increased the wearing properties of the coating are increased but the speed of travel of the gob is decreased; whereas, if the amount of graphite is increased, the wearing properties of the coating are decreased and the speed of travel of the gob is increased.

In applying the coating to the chute, the chute is first thoroughly cleaned by solvents, blasting or in any other suitable manner. The thermo-setting resin and graphite are intimately mixed with a thinner and the mixture is then applied to the chute by painting, spraying, or dipping. The coated chute is then baked to volatilize the thinner, cure the resin and bond it to the chute. A heavy coating or successive coatings may be applied; the thicker the coating the longer the life of the coating.

I have conducted extensive tests on coatings such as these and have found that the chutes coated as described offer distinct advantages not heretofore obtained. For example, the time of travel is uniform and constant as contrasted to bare chutes or chutes swabbed with oil or oil dope. The frictional drag is decreased to a minimum so that the shape or surface of the gob is not altered. The coating does not contaminate the surface of the gob, and is resistant to heat. Oil and water do not affect the coating. The coating made in accordance with this invention thus possesses all the desired properties of such a coating.

A further advantage of chutes coated in accordance with the invention is that it is possible to obtain speeds of travel of the gob not heretofore possible. This is especially of value in present day development of high speed glass making machines where one limitation has been the speed of travel of the gob to the machine. By utilizing coatings in accordance with the invention it is possible to operate these new machines at higher speeds. In these machines, a coating having the composition, 60% graphite, 40% resin, has been found to be satisfactory.

I have also determined that materials other than graphite may be used. For example, molybdenum disulphide is resistant to high temperature and has the desired lubricating properties.

I claim:

1. A gob chute for receiving and delivering a gob of molten glass and having a guiding surface along which the gob is guided, the chute having a coating bonded to the guiding surface, said coating consisting essentially of an intimate mixture of a thermosetting resin and a lubricating filler selected from the group consisting of graphite and molybdenum disulphide.

2. A gob chute for receiving and delivering a gob of molten glass and having a guiding surface along which the gob is guided, the chute having a coating bonded to the guiding surface, said coating consisting essentially of an intimate mixture of a phenolic resin and graphite.

3. The combination with a glass feeder for delivering gobs of molten glass, of a gob chute mounted beneath the feeder in position for receiving gobs of molten glass as they are delivered from the feeder, said chute having a downwardly inclined guiding surface along which the molten gobs are guided, the chute comprising a coating bonded thereto and forming the guiding surface, said coating consisting essentially of an intimate mixture of a thermosetting resin and a lubricating filler selected from the group consisting of graphite and molybdenum disulphide.

4. The combination set forth in claim 3, the said mixture consisting of a phenolic resin and graphite.

References Cited in the file of this patent

UNITED STATES PATENTS

| | | |
|---|---|---|
| 1,199,108 | Peiler | Sept. 26, 1916 |
| 2,106,545 | Bates | Jan. 25, 1938 |
| 2,581,301 | Saywell | Jan. 1, 1952 |

FOREIGN PATENTS

| | | |
|---|---|---|
| 270,271 | Great Britain | 1928 |
| 654,275 | Great Britain | June 13, 1951 |